Oct. 22, 1946. L. C. PACKER 2,409,891
VARIABLE SPEED MOTOR
Filed Dec. 9, 1942 2 Sheets-Sheet 1

WITNESSES:

INVENTOR
Lewis C. Packer.
BY
ATTORNEY

Oct. 22, 1946.  L. C. PACKER  2,409,891
VARIABLE SPEED MOTOR
Filed Dec. 9, 1942  2 Sheets-Sheet 2

WITNESSES:

INVENTOR
Lewis C. Packer.
BY
ATTORNEY

Patented Oct. 22, 1946

2,409,891

UNITED STATES PATENT OFFICE 2,409,891

VARIABLE-SPEED MOTOR

Lewis C. Packer, Longmeadow, Mass., assignor to Westinghouse Electric Corporation, East Pittsburgh, Pa., a corporation of Pennsylvania Application December 9, 1942, Serial No. 468,339

2 Claims. (Cl. 172—278)

My invention relates to variable-pole-number, squirrel-cage induction-motors having the minimum number of leads necessary to be reconnected in changing the pole-number, and having the best possible efficiency and the smallest possible frame-size for any given motor-output or horsepower-rating. While my invention is not limited to any particular motor-application, it was primarily designed for use in variable-speed single-phase fan-motors, having a starting winding which is cut out by means of a centrifugal starting-switch.

Various arrangements have been tried, heretofore, for providing a fan-motor which is operable at either one of two different pole-numbers, for variable-speed operation. Usually, this has meant the provision of two separate main windings, and two separate starting windings, with five leads brought out to the control-switch. This has meant low efficiency, costly windings, and costly switch constructions and connections, and it has necessitated the use of an excessively large frame-size of the motor-stator in order to accommodate the necessary windings.

In accordance with my invention, I provide a single main winding, made up in the form of a large number of coils, which are connected together in a special manner in a plurality of different circuits, three circuits being preferably provided, so arranged that the pole-number of the winding may be changed by the process of eliminating one of the winding-circuits and reversing another, or otherwise changing the series-parallel combinations of the winding-circuits, so that the motor will operate at a speed corresponding to one pole-number, for one set of connections, and the other pole-number when the connections are changed.

I have found that it is by no means necessary to achieve anything resembling a close approach to a sinusoidal flux-distribution form, for each of the pole-numbers desired, as it is quite feasible, and more economical than any other known method of varying the primary winding pole-number, to utilize field-flux wave-forms which are quite irregular, non-uniform in distribution about the circumference of the stator-member, and involving, in some cases, consequent poles, so that each wave-form resolves itself into a rather large number of prominent harmonics or pole-numbers, of which the harmonic corresponding to the operational pole-number does not even have to be the largest or predominating harmonic. Thus, a squirrel-cage induction-motor is capable of operating very efficiently as an 8-pole motor even though its primary wave-form contains large harmonics or components in the 2-pole, 4-pole and 6-pole combinations, as well as numerous components corresponding to larger numbers of poles, more than 8. The 8-pole flux-component is capable of carrying the motor through the synchronous speeds corresponding to higher pole-numbers, so that, under ordinary slip-conditions for the 8-pole operation, the fluxes rotating at speeds corresponding to all of the pole-numbers will be sufficiently damped out by the squirrel-cage winding, so as not to be troublesome.

In the preferred form of embodiment of my invention, I provide the single-phase primary winding, or each phase of the primary winding, with three winding-circuits, each circuit comprising a plurality of selected coils disposed at different points around the circumference of the stator-member, these coils being connected together, in selected polarities, either in series or parallel circuit-relationship to each other. These three main-winding circuits are preferably connected in star, so that there are only three motor-leads. One pole-number connection, such as a 6-pole connection, is obtained by connecting two of the motor-leads together, to one line-conductor, and connecting the third motor-lead to the other line-conductor. The other pole-number connection, such as an 8-pole connection, is obtained by connecting the first two motor-leads across the two line-conductors of the single-phase supply-line, and leaving the third motor-lead unenergized. The pole-number of the starting-winding may be changed in the same manner as the main winding, but preferably, in my invention, I utilize a starting-winding which has both 6 and 8-pole harmonics, so that it will serve for starting the motor on either one of the selected pole-numbers, and this starting-winding is suitably energized, as by being connected in parallel with one of the two motor-circuits which is always in service, whichever pole-number is selected.

With the foregoing and other objects in view, my invention consists in the apparatus, circuits, systems, connections, combinations and methods hereinafter described and claimed, and illustrated in the accompanying drawings, wherein:

Figure 3:
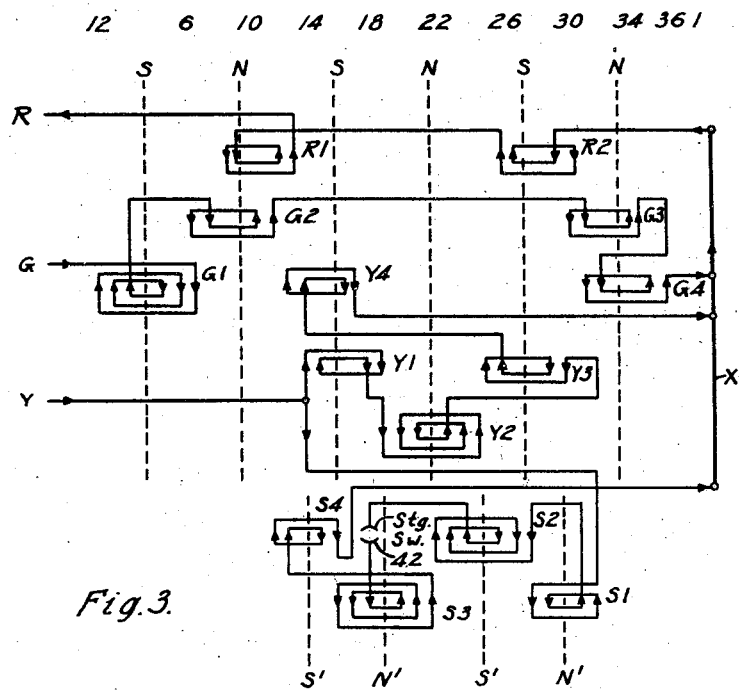
Figure 4:
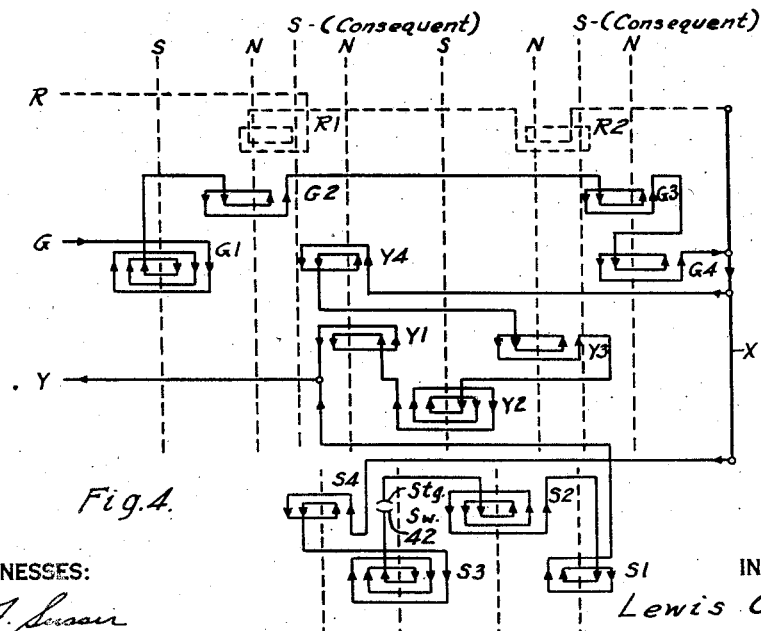

Fig. 3 is a schematic developed view of the stator-windings, showing the polarities of the several coils, and their connection, for the 6-pole operation, with the various coils physically separated, for convenience in tracing the connections of the many overlapping coils, and with the pole-centers of the different coil-combinations appropriately marked; and Fig. 4 is a view similar to Fig. 3, but showing the 8-pole connections.

Figure 1:
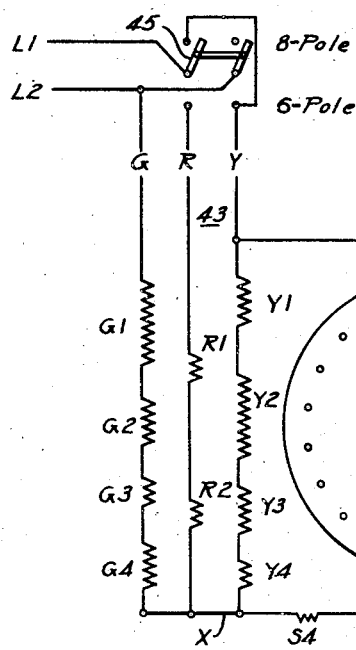
Figure 1 is a diagrammatic view of a preferred or exemplary form of my invention, with schematic showings of the motor, all of the winding-connections and a control-switch.

In Fig. 1, I show a self-starting single-phase squirrel-cage, induction-motor to which my invention is applied. The squirrel-cage member is indicated at 40, and it is the rotor-motor of the motor, being mounted on a shaft 41 which carries a centrifugal starting-switch 42. The squirrel-cage secondary-windings are responsive to both or all of the pole-numbers of the motor. The primary windings of the motor are shown diagrammatically alongside of the rotor-member 40, in accordance with a common conventional showing. As illustrated, the primary windings comprise a three-branched main-winding 43, and a starting-winding 44.

The three branches or circuits of the main winding 44 are distinguished by the letters Y, R and G, representing the colors of the motor-leads, which may be yellow, red and green, respectively. The Y-circuit is illustrated as comprising four different coils Y1, Y2, Y3 and Y4, disposed at different points around the periphery of the stator-member, so as to have different phase-relationships, and serially connected in certain selected polarities, as will be subsequently described. The R-circuit is illustrated as comprising two serially connected coils R1 and R2, while the G-circuit is illustrated as comprising four serially connected coils G1, G2, G3 and G4. The three main-winding circuits Y, R and G are connected, interiorly of the motor, at a common connection-point X, which may be conveniently referred to as a star-point.

The starting-winding 44 is shown as comprising four specially disposed and designed starting-winding coils S1, S2, S3 and S4 which are serially connected in a circuit which parallels the Y-branch of the main-winding 43, the starting-switch 42 being connected at an intermediate point of the starting-winding circuit, as shown.

The control of my motor, as shown in Fig. 1, consists simply in connecting the motor-terminals marked Y and G to one line-conductor, L2, and connecting the other motor-terminal R to the other line-conductor L1, for 6-pole operation, and connecting the two motor-terminals Y and G across the two line-conductors L1 and L2 for 8-pole operation, leaving the R-terminal unconnected. For convenience of illustration, I have shown a double-pole switch 45 which can be closed, in one direction or the other, to make either the 6-pole or the 8-pole connection, and which may be opened to disconnect the motor from the source.

The various coils of the primary winding have been lettered and numbered, not in accordance with their disposal within the slots of the stator-member of the motor, but in accordance with the order in which they happen to be connected in the various branch-circuits of the motor. The positions, polarities, relative numbers of turns, coil-spans, and relative wire-sizes, of the various stator-winding coils, are all to be chosen so that a predetermined alteration in the manner of energization of the three external motor-leads Y, R and G will give satisfactory operation at both or all of the operating pole-numbers selected for the motor. This design and selection, in regard to the distribution, size and arrangement of the various motor-coils, may be accomplished with the aid of theoretical analysis of flux-layouts, or it may be perfected by empirical alterations of the various numbers of turns and locations of the coils, for obtaining a desired performance and avoiding undesirable hot-spots in the stator-winding. Obviously, the selection of the particular magnitudes or numbers of turns of the various coils, their precise distributions in the stator-slots, and other features, are susceptible of a wide variety of solutions, so that my invention is not at all limited to any particular solution of the problem.

By way of illustration, however, I will refer to a satisfactory layout for a 36-slot stator-member of a variable-speed fan-motor for driving a room-fan having blades of 24" diameter, at speeds corresponding to 6 and 8 poles, respectively, on a 60-cycle circuit. For convenience in winding, I have found it desirable to lay the stator-windings in three different layers, in the stator-slots, as indicated by the dotted construction-lines 61, 62 and 63 in Fig. 2. These layers do not correspond to the four winding-circuits of the motor, but are simply chosen for the convenience of the shop in inserting the different coils in the stator-slots, the first layer, marked 61, being laid in the bottoms of the slots, the layer 62 being laid over the first layer, and the layer 63 being put in last, so as to lie closest to the air-gap of the motor. A satisfactory layout for such a motor is shown in the following tabulation:

| Slot | First layer | Second layer | Third layer |
|---|---|---|---|
| 1 |  | 36 |  |
| 2 | G1 {29, 55, 46} |  |  |
| 3 |  |  |  |
| 4 |  |  |  |
| 5 | G1 {46, 55, 29} |  |  |
| 6 |  |  |  |
| 7 |  |  |  |
| 8 |  | G2 {36, 48} |  |
| 9 | R1 {36, 18} |  |  |
| 10 |  |  |  |
| 11 |  | G2 {48, 36} |  |
| 12 |  |  |  |
| 13 | R1 {18, 36} |  |  |
| 14 | Y4 {36, 18} |  |  |
| 15 |  | Y1 {36, 48} |  |
| 16 |  |  |  |
| 17 | Y4 {36, 18} |  |  |
| 18 |  |  |  |
| 19 |  | Y1 {48, 36} |  |
| 20 | Y2 {29, 55, 46} |  | S3 {27, 18, 27} |
| 21 |  |  |  |
| 22 |  |  |  |
| 23 |  |  | S3 {45, 18, 45} |
| 24 | Y2 {46, 55, 29} |  |  |
| 25 |  |  |  |
| 26 |  | Y3 {36, 48} | S2 {27, 18, 45} |
| 27 | R2 {36, 18} |  |  |
| 28 |  |  |  |
| 29 |  | Y3 {48, 36} | S1 {27, 18, 27} |
| 30 | R2 {18, 36} |  |  |
| 31 | G3 {36, 18} |  |  |
| 32 |  |  | S1 {18, 27} |
| 33 |  | G4 {36, 48} |  |
| 34 |  |  |  |
| 35 | G3 {36, 18} |  |  |
| 36 |  | G4 {48} |  |

Thus, the first coil G1 is really a coil-group, consisting of a 29-turn coil lying in the bottoms of slots 1 and 7, a 55-turn coil lying in slots 2 and 6, and a 46-turn coil lying in slots 3 and 5, all permanently connected together in series as a single coil or coil-group, called G1; the second coil R1 consists of a 36-turn coil lying in slots 9 and 13 and an 18-turn coil lying in slots 9 and 12, connected together as a single group; and so on.

While I am not limited, of course, to any particular wire-size, it is noted that I use #19 enameled wire, of 36 mils diameter, for the largest coils G1 and Y2; #20 wire, of 32 mils diameter, for the rest of the main winding; and #29 wire, of 11.3 mils diameter, for the starting-winding coils S1, S2, S3 and S4.

Figure 2:
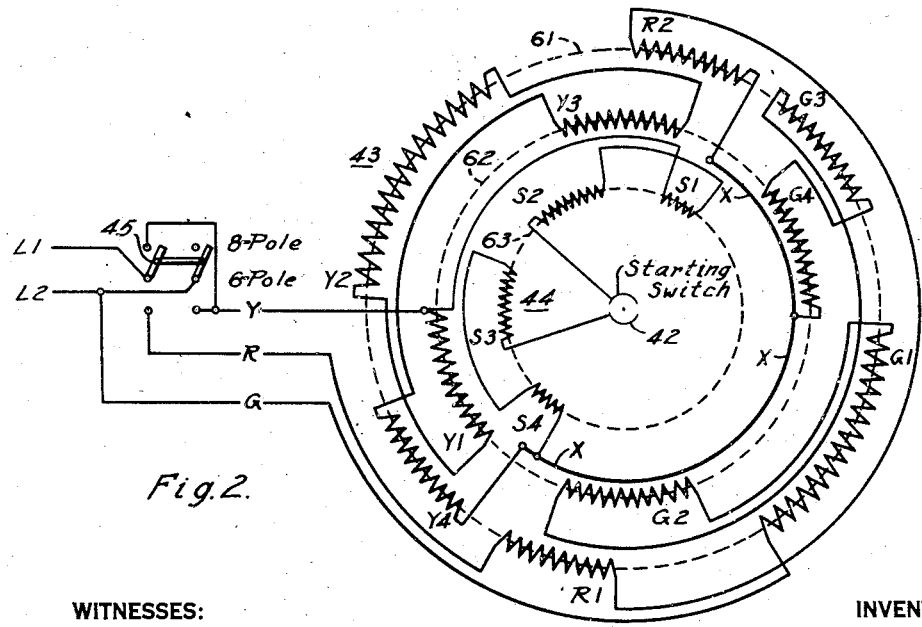
Fig. 2 is a schematic layout of the stator or primary windings, illustrative of the preferred method of winding the motor in three successive layers in the stator-slots.

The polarities of the connections of the various coils are indicated in Figs. 2, 3 and 4. Fig. 3 is a view showing a development of the winding, with the coils spaced from each other, instead of being shown in their actual physical conditions of having all coil-sides which lie in the same slots superimposed one on another, and the center-lines of the various poles are also indicated, for the 6-pole connection, assuming current entering the motor at the terminals Y and G, and leaving it at the terminal R, at the moment illustrated. It is noted that there are 6 poles of the main winding; while the starting winding spans only a little more than half of the circumference, and has only four wound poles, the remaining two poles being consequent poles (not shown).

Fig. 4 is a view similar to Fig. 3, for the 8-pole connections, illustrating the polarities for the moment when the current is entering the motor at the G-terminal and leaving it at the Y-terminal, thus reversing the current in the Y-circuit coils, and open-circuiting the R-circuit coils which were energized in Fig. 3. It is noted that there are only 6 excited poles and 2 consequent poles of the main winding, the first consequent pole being located between the coils G2 and Y4, and the second consequent pole being located between the coils Y3 and G3. The starting winding has four wound poles in the same positions as before, only reversed in polarity. The reversal of the polarity of the starting-winding is brought about by connecting the starting winding S1, S2, S3, S4 in shunt-circuit relation to that main-winding circuit, Y1, Y2, Y3, Y4, in which the direction of current-flow is reversed in changing from one pole-number to the other.

The reason why the starting-winding current must be reversed, when the pole-number connections of the main winding are changed, is that the starting-winding magneto-motive-force or flux-distribution has a distorted wave-form of a nature including both of the pole-numbers, for 6-pole and 8-pole operation, but the 6- and 8-pole components of the starting-winding flux are out of phase with the corresponding 6- and 8-pole fluxes of the main windings, so that the effective starting-winding flux-component of one pole-number leads the main-winding flux of that pole-number, while the starting-winding flux-component of the other pole-number lags the corresponding main-winding flux of that other pole-number. That is why the starting-winding polarity must be reversed, when the primary-winding pole-number is changed, so that the direction of rotation of the motor will not be changed.

The wave-form of the starting-winding has an 8-pole component which produces four more consequent poles (not shown), distributed around the rest of the circumference of the stator.

The exact distributions of the winding-coils, as shown, were chosen to satisfy the requirements of a specific job, but the winding does not need to be confined to these details for other jobs. It is to be noted that I utilize a minimum of motor-leads, namely, three, changing the main-winding coils to effect a change in their pole-number, but not disturbing the starting-winding arrangement, although it is obvious that the starting-winding, as well as the main winding, might be altered, in changing from one pole-number to the other. It is also to be understood that I am not confined to any particular combination of pole-numbers, such as the 6 and 8-pole combination which is illustrated, as other pole-numbers may be utilized.

While the same minimum number of three leads can be obtained in a two-pole-number motor using two separate and complete windings, one for each pole-number, the losses for such a two-winding motor are greater than in my present motor, because the distribution of copper in the two-winding motor cannot be as economical as is obtainable with the present motor. This is proved both by design-calculations, and by actual tested results.

My invention makes it possible to build a double-pole-number motor of a given fractional-horsepower rating on a smaller frame-size than has been heretofore possible, with consequent savings in the cost of the motor, and with the minimum possible number of motor-leads, thus further contributing to the low cost, both of the leads themselves and of the labor necessary to connect them to the starting switch.

I claim as my invention:

1. A self-starting, single-phase, plural-pole-number induction motor, having a stator member having a main winding and a starting winding, and having a rotor member having a secondary winding of a type suitable for a plurality of different pole-numbers, the main winding having a plurality of winding-groups connected together internally of the machine and having a plurality of terminal-leads, the winding-groups being such that the pole-number is changed by changing the manner in which the terminal-leads are connected in a single-phase circuit, externally of the machine, the starting winding occupying slots in considerably less than all of the circumference of the stator member and having such flux-distribution wave-form as to be capable of effectively operating to start the motor at either pole-number without any change in the starting-winding flux-distribution wave-form, and internal circuit-connections for connecting said starting winding in parallel-circuit relation to one or more of the winding-groups of the main winding which are energized for both pole-number operations.

2. A self-starting, single-phase, plural-pole-number induction motor, having a stator member having a main winding and a starting winding, and having a rotor member having a secondary winding of a type suitable for a plurality of different pole-numbers, the main winding having a plurality of winding-groups connected together internally of the machine and having a plurality of terminal-leads, the winding-groups being such that the pole-number is changed by changing the manner in which the terminal-leads are connected in a single-phase circuit, externally of the machine, the main winding having a plurality of circuits including one particular main-winding circuit which is in use in both pole-number connections, but with a reversal of current-flow in that particular main-winding circuit when the connections are changed from one pole-number to the other, the starting winding having such flux-distribution wave-form as to be capable of effectively operating to start the motor at either pole-number without any change in the starting-winding flux-distribution wave-form, and internal circuit-connections for connecting said starting winding in parallel-circuit relation to that particular main-winding circuit.

LEWIS C. PACKER.